(12) United States Patent
Park et al.

(10) Patent No.: US 10,545,686 B2
(45) Date of Patent: Jan. 28, 2020

(54) PRIORITIZING TASKS FOR COPYING TO NONVOLATILE MEMORY

(71) Applicant: HEWLETT PACKARD ENTERPRISE DEVELOPMENT LP, Houston, TX (US)

(72) Inventors: Justin Haanbyull Park, Houston, TX (US); Thierry Fevrier, Gold River, CA (US); David F Heinrich, Tomball, TX (US); David W Engler, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/748,645

(22) PCT Filed: Jul. 31, 2015

(86) PCT No.: PCT/US2015/043236
§ 371 (c)(1),
(2) Date: Jan. 29, 2018

(87) PCT Pub. No.: WO2017/023269
PCT Pub. Date: Feb. 9, 2017

(65) Prior Publication Data
US 2018/0364928 A1    Dec. 20, 2018

(51) Int. Cl.
*G06F 12/00* (2006.01)
*G06F 3/06* (2006.01)
*G06F 9/4401* (2018.01)
*G06F 1/30* (2006.01)
*G06F 9/50* (2006.01)

(52) U.S. Cl.
CPC .............. *G06F 3/0619* (2013.01); *G06F 1/30* (2013.01); *G06F 3/0647* (2013.01); *G06F 3/0679* (2013.01); *G06F 9/4401* (2013.01); *G06F 9/5005* (2013.01)

(58) Field of Classification Search
None
See application file for complete search history.

(56) References Cited

U.S. PATENT DOCUMENTS

| | | |
|---|---|---|
| 7,421,552 B2 | 9/2008 | Long |
| 8,169,839 B2 | 5/2012 | Moshayedi et al. |
| 8,200,929 B1 | 6/2012 | Sartore |
| 8,325,554 B2 | 12/2012 | Sweere et al. |

(Continued)

FOREIGN PATENT DOCUMENTS

WO    WO-2014-047049 A2    3/2014

OTHER PUBLICATIONS

PCT/ISA/KR, International Search Report and Written Opinion, dated Apr. 27, 2016, PCT/US2015/043236, 12 pages.

(Continued)

*Primary Examiner* — Daniel D Tsui
(74) *Attorney, Agent, or Firm* — Hewlett Packard Enterprise Patent Department

(57) ABSTRACT

A computing device having firmware, an uninterruptible power supply (UPS), and a memory module with volatile memory. Firmware tasks are prioritized to elevate tasks associated with the copying of the contents of the volatile memory to the nonvolatile memory external to the memory module during the loss of main or primary power.

13 Claims, 6 Drawing Sheets

(56) References Cited

U.S. PATENT DOCUMENTS

| | | | |
|---|---|---|---|
| 8,949,502 B2 | 2/2015 | McKnight et al. | |
| 2002/0199093 A1* | 12/2002 | Poisner | G06F 9/4401 |
| | | | 713/1 |
| 2005/0117418 A1* | 6/2005 | Jewell | G06F 11/1441 |
| | | | 365/202 |
| 2006/0139069 A1 | 6/2006 | Frank et al. | |
| 2006/0212644 A1 | 9/2006 | Acton et al. | |
| 2007/0168715 A1 | 7/2007 | Herz et al. | |
| 2013/0060124 A1 | 3/2013 | Zietsma | |
| 2013/0097451 A1 | 4/2013 | Kuroda et al. | |
| 2014/0035376 A1* | 2/2014 | Li | G06F 1/30 |
| | | | 307/66 |
| 2016/0378344 A1* | 12/2016 | Nachimuthu | G06F 3/065 |
| | | | 711/103 |

OTHER PUBLICATIONS

Smart Technical Brief: NVDIMM, Smart Modular Techologies, 2014, 5 pages.

\* cited by examiner

100

100

200

310

PRIORITIZING TASKS FOR COPYING TO NONVOLATILE MEMORY

BACKGROUND

Computing devices typically have volatile memory, such as processor cache, random access memory (RAM), and so on. In operation, the operating system of the computing device may direct a processor to store data in the volatile memory. Volatile memory generally requires power.

Computing devices may experience a loss of power, or a catastrophic error event related to hardware, software, and/or loss of power. Such triggering events may result in the shutdown of the computing device and the associated interruption of power to the computing device. The loss of power, or a shutdown and associated interruption of power, may result in the loss of data in volatile memory of the computing device.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
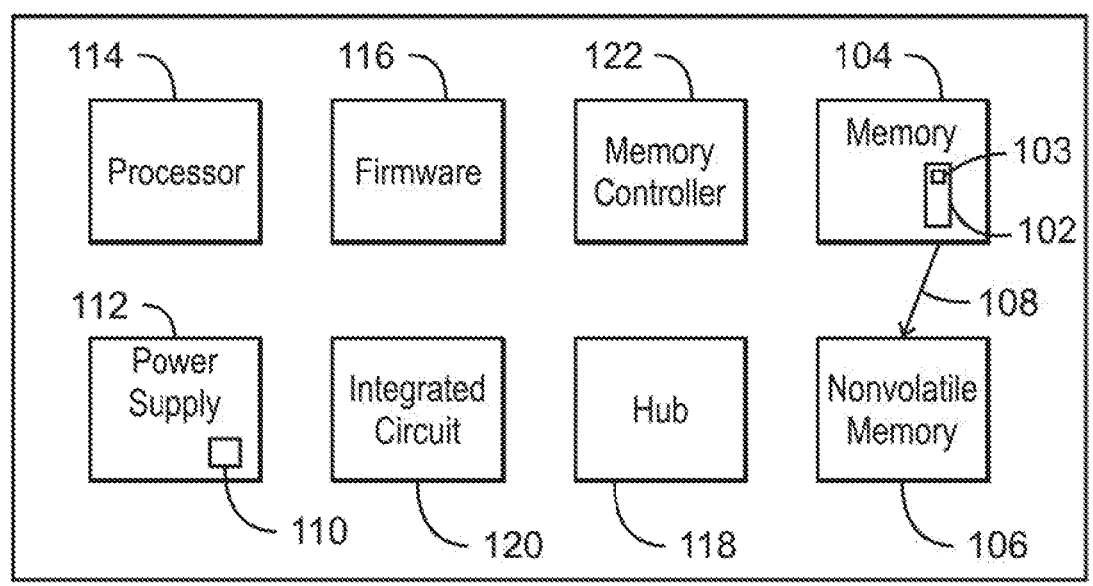
FIG. 1 is a block diagram of a computing device having an architecture for copying data from volatile memory of a memory module to nonvolatile memory external to the memory module during a catastrophic event such as loss of power in accordance with examples.

Examples include a computing device, such as a server, having an uninterruptible power supply (UPS). The UPS may be a "micro" UPS inside or outside of the server, and which provides power for a relatively short time, e.g., 15 seconds, 60 seconds, 3 minutes, 5 minutes, etc., at full load. Therefore, with operation based on power supply from the UPS during loss of main power, a backup of volatile memory to nonvolatile memory may have a limited amount of time to implement with the micro UPS as the power source. Accordingly, a firmware or BIOS initialization may be prioritized to favor the backup. In other words, in a BIOS boot sequence, the copying of volatile data to nonvolatile memory is given high priority. Thus, the BIOS may favor initialization of memory and PCIe devices, and to load tables for communications, and so forth, that facilitate the copying.

The techniques may be applicable to loss of primary or main power, and to other catastrophic events such as catastrophic error or CATERROR, or events related to hardware and/or software failures, and so on. A CATERROR can be tied to the system processor or CPU. Software failures may be related to the operating system or drivers, and the like. In general, a catastrophic event or catastrophic error may encompass loss of power.

A computing system or device may include a number of memory modules. These memory modules may serve as system memory or "primary memory" of the system, which may store information for running programs and the like. The volatile memory on the memory modules may lose data upon the computing device experiencing a power loss or catastrophic error causing a system shutdown. However, the computing device and/or memory modules may provide for persistence and saving of the data in the event of a power loss or catastrophic event. In particular, the tasks, e.g., firmware tasks, for copying of volatile data to nonvolatile memory may be identified and given high priority so that the backup of the data can be completed, for instance, within the time of a power supply by a UPS. In one example, the UPS is embedded in the system power supply unit (PSU), such as a PSU that converts alternating current (AC) to direct current (DC).

Some examples of the computing device have a an architecture in which the memory module may be a dual in-line memory module (DIMM) and where components external to the memory module facilitate copying of the data from the volatile memory on the DIMM to nonvolatile memory external to the DIMM. The computer device architecture, i.e., system components, facilitates the backup of volatile memory of the memory module. Such a configuration for or architecture of the computing device may facilitate the backup as not self-contained on the memory module.

Some architectures may encompass a UPS external to the memory module but inside the computing device or server, providing power to allow a copy of data from volatile memory to non-volatile memory during loss of main power to the computing device. The area of the copied data of the volatile memory may be marked as persistent and used as persistent by applications and, therefore, the copying action may be similar to a write back cache. The UPS can also be external to the server as a rack level UPS or even wider scale UPS such as a data center backup generator, and so forth.

Persistence in examples of the present case may mean the volatile data is preserved across catastrophic events such as a surprise power down. Moreover, a prioritized set of BIOS tasks may increase beneficial use of the energy in the UPS. Furthermore, persistence at large sizes, e.g., 512 gigabyte (GB) or greater, of memory with dynamic random access memory (DRAM) speeds may be implemented. Such may facilitate complete databases, or a large portion of a database, to be loaded into system memory. However, latency to start this copy task may have an impact on the memory size. For instance, in some examples, the UPS may only power the computing device or server for a relatively short time, e.g., 30 seconds, 60 seconds, after a power interruption. If the latency to start the copy task is multiple seconds, then a noticeable percentage of the UPS energy is not used initially for the copy task.

In general, examples of the present techniques include a computing system or device having one or more processors (e.g., central processing units or CPUs) and one or more memory modules e.g., dual in-line memory modules or DIMMs or other modules, having volatile memory such as for random access memory (RAM). As indicated, the computing device may have a UPS to provide power in a scenario of loss of primary power, such that the copying of the volatile data to nonvolatile memory may be implemented. In certain examples, the UPS may be a small or "micro" UPS that provides for a relatively short amount of time (e.g., 60 seconds at full load) of power supply to the computing in a loss of system power scenario. Accordingly, as mentioned, the tasks, e.g., firmware tasks, for copying of volatile data to nonvolatile memory may be identified and given high priority so that the backup of the data can be completed within the time of power supply by the UPS. Yet, it should be noted that the amount of time of power provided by the UPS at full load may be seconds, minutes, hours, or days.

Examples of the computing devices accommodate the preservation or persistence of data in the volatile memory in the event of the computing device losing main power or experiencing an error that cause a partial or system shutdown of the computing device. Examples of the present techniques are directed to prioritizing the backup action for volatile memory of a DIMM via a system architecture external to the DIMM. As discussed, in such a configuration, the memory module may be a standard DIMM in certain examples with volatile memory but no nonvolatile memory on the memory module for backup, no media controller on the memory module for backup, and no uninterruptible power supply (UPS) on the memory module. Instead, the persistence may be based on system components external to the memory module or DIMM. Of course, the present techniques may accommodate memory modules configured for self-contained persistence or the self-contained transfer of the volatile data to nonvolatile memory.

In general, instead of or in addition to nonvolatile memory on the memory module or DIMM for backup, a nonvolatile memory (e.g., solid state drive, hard drive, flash media, etc.) external to the memory module or DIMM is employed for the backup. Further, instead of or in addition to a media controller on the memory module or DIMM for control of a backup operation, the computing-device system processor (e.g., CPU), firmware (e.g., BIOS), chipset including the south bridge or platform controller hub (PCH), and/or system memory controller external to the memory module or DIMM, may facilitate or control the backup from the DIMM volatile memory to the external nonvolatile memory or hard drive. Also, instead of or in addition to a UPS on the memory module to provide power for the backup operation in a loss of power scenario, a UPS external to memory module or DIMM may provide such power. For certain variations of a computing device having these architectures of the aforementioned components external to the memory module, the DIMM may be labeled as a persistence memory module.

As indicated, a firmware or BIOS may initiate or drive the flushing or copying of the data from volatile memory on the memory module to the nonvolatile memory external to the memory module. The BIOS set of code, in general, executes tasks sequentially as it runs during the booting process. This process has been known to take longer with each passing generation. Thus, to address execution time, the BIOS tasks may be prioritized in a manner to elevate the priority of the tasks for copying of the data from volatile memory to nonvolatile memory. Examples herein provide for a prioritized sequence of tasks for BIOS execution. In prioritizing the backup tasks, the firmware executes at a high priority, assuming this firmware is resident in the BIOS code.

Without prioritization, the embedded or micro UPS after a surprise interruption of the main power may not provide enough length of time of power for the flush operation to execute, i.e., to complete the backup copying. In some examples, the system processors or CPUs, e.g., an array controller, may flush associated DRAM memory to the nonvolatile drives. Again, such may tackle persistence for a DIMM via system architecture, including where several seconds of latency may be experienced before the flush command issues, e.g., from the operating system (OS) to the array controller. In some examples, this latency may be attributed to other jobs executing in front of the copy task. Such latency could grow with the software load running at the time of the triggering or initiating event. This overhead may waste energy in the UPS, at least with respect to energy that could be used for the persistence task.

Turning to the drawings, FIG. 1 is a computing device 100 such as a server, data server, blade server, host, client computer, personal computer (PC), laptop, portable device, or other type of computing system. The computing device 100 has at least one memory module 102 having volatile memory 103 in a memory 104. The memory 104 may be, for example, random access memory (RAM). The memory module 102 includes the volatile memory 103 and may be a dual in-line memory module (DIMM), a nonvolatile dual in-line memory module (NVDIMM), or other type of memory module. The volatile memory 103 on the memory module 102 may be, for example, dynamic random access memory (DRAM), static random access memory (SRAM), or the like. The operating system of the computing device 100 may direct a processor to store data in the volatile memory 103. Volatile memories may include capacitors to store data, and those capacitors must have their charge replenished from time to time.

In certain examples, the computing device 100 provides for persistence of the contents or data of the volatile memory 103 on the memory module 102 by copying or backing up the contents or data from the volatile memory 103 to nonvolatile memory 106, as indicated conceptually by arrow 108. In the illustrated example, the nonvolatile memory 106 is external to the memory module 102 and memory 104. The nonvolatile memory 106 may be a hard drive (e.g., solid-state drive or SSD) or other nonvolatile memory device. The nonvolatile memory 106 may be part of the computing device 100, as depicted, or may be external to the computing device 100. Further, an operating system (OS) and other applications or software may be stored in the nonvolatile memory 106 are other nonvolatile memory associated with the computing device 100.

Upon a power loss or catastrophic error event, e.g., due to a system failure, data from the volatile memory 103 on the memory module 102 may be copied to the nonvolatile memory 106 for backup and persistence purposes. The data that is copied to the nonvolatile memory 106 may be retrieved by another device, and/or by the computing device 100 upon restoration of main power, reboot or power cycle, etc., of the computing device 100. In short, in such systems, the backup of data from volatile memory 103 to nonvolatile memory 106 may be performed when the computing device 100 crashes, reboots, shuts down, loses power, etc.

The computing device 100 may have a UPS 110 that accommodates a loss-of-power scenario in the copying of data from the volatile memory 103 of the memory module 102 to the nonvolatile memory 106. The UPS 110 may be a battery, capacitor(s), etc. In examples, the UPS 110 may be relatively small or a "micro" UPS which provides for a short time (e.g., about 60 seconds at full load) of power supply. However, the UPS may be a larger UPS and/or external to the computing device 100, and provide for power for several minutes or hours.

The UPS 110 may be embedded in a power supply unit (PSU) 112, as depicted, of the computing device 100. In certain examples, the PSU 112 converts AC to DC for feed to the components of the computing device 100. The PSU 112 may receive electricity from a supply or mains external to the computing device 100. The UPS 110 may be additional component of the PSU 112 and which generally does not participate in the normal operation of the PSU 122 but is can be utilized when power is loss to the PSU 112.

Additionally, the computing device 100 includes at least one processor 114 and firmware 116. The processor 114 may be a central processing unit (CPU) or other processor. The firmware 116 may include executable code on nonvolatile memory such as read-only memory (ROM). The firmware 116 code may include a BIOS executable by the processor 114. If the firmware 116 includes a BIOS, the BIOS may be a legacy BIOS, a Unified Extensible Firmware Interface (UEFI), or other type of BIOS. In examples, the firmware 116 generally or the BIOS in particular may include code executable by the processor 114 to initiate and/or drive the copying of the contents/data from the volatile memory 103 of the memory module 102 to the nonvolatile memory 106.

Furthermore, the computing device 100 may include a chipset or hub 118 architecture such as a south bridge, input/output (I/O) hub, platform controller hub (PCH) 118, and/or other hub architectures. Various arrangements are contemplated. For example, the chipset(s) may generally include the south and north bridges or the PCH, and the like. The hub 118 circuitry may be configured to interface with components including various input/output (I/O) devices and firmware 116 ROM, for example. In a particular example, the hub 118 is a PCH.

Moreover, the computing device 100 may include an electronic component or integrated circuit 120 that intercepts an error signal or shutdown signal from the processor 114. The integrated circuit 120 may be a programmable logic device (PLD), a complex programmable logic device (CPLD), and so on. The integrated circuit 120 may be programmed to intercept an error signal or shutdown signal from the processor 114 so to delay shutdown of the computing device 100. In certain examples, the persistence operation or copying of volatile data to nonvolatile memory 106 may be performed during the delay prior to the shutdown.

The computing device 100 may include memory controller 122 or system memory controller, and so on. In the illustrated embodiment, the memory controller 122 is separate from the memory module 102. The memory controller 122 may facilitate control of memory in the computing device 100, including control of the memory module 102 and the memory 104. The memory controller 122 may be separate from the processor 114 or integrated with the processor 114. If integrated with the processor 114, the memory controller 122 may be labeled as an integrated memory controller (IMC), for instance. In general, the memory controller 122 may be part of a memory subsystem in the computing device 100.

For a memory module 102, e.g., a DIMM, with persistence implemented via components (e.g., the processor 114 and nonvolatile memory 106 external to the memory module 102, etc.), the memory module 102 may be labeled as a persistent memory module or persistent DIMM in certain examples, or that the volatile memory on the memory module is in effect persistent. Of course, such labels or terms are not limiting, and other labels and terms are applicable. In these configurations or similar configuration with reliance on components external to the memory module 102 for persistence of the contents of the volatile memory 124, examples of the present techniques may accommodate persistence with a loss of power, a catastrophic (e.g., CATERROR) event initiation in the computing device 100, or with a triggering event generally that may result in shutdown of the computing device and the loss of data from the volatile memory 124 of the memory module 102. For a persistence of volatile memory on a DIMM dependent on system components external to the DIM, the single fault mechanisms expanding out to the system boundary instead of confined to a DIMM may affect the backup copying. The persistence may not be self-contained on the memory modules, as with other types of NVDIMMs. The system external to the memory module 102 of course may be defined as the CPU complex, memory subsystem, IO subsystem, baseboard management controller, and so forth. The system persistence architecture may generally include the processor or CPU. Even if a system peripheral is used in a direct memory access function, the root ports, memory bus, etc., for the CPU complex may need to be functional. Machine Check Exceptions (MCE) and SYSERR are failures within the system boundary that may be detrimental to a DIMM which relies on components external to the memory module for the persistence or the backup copying. In some examples, these errors are usually defined as catastrophic errors (CATERROR) that disable the CPU complex.

It should be noted that in some examples, the backup copying for persistence may be initiated or driven via electronic circuitry, i.e., hardware, which implements the functionality of the backup. The backup or copying of the data may involve software, firmware (as mentioned), or both. For example, the copying of data from volatile memory 103 to nonvolatile memory 106 may be implemented partially or fully by system firmware 116, e.g., the BIOS, as mentioned, or in the chipset of the computing device 100. As another example, the backup may be implemented partially or fully in a dedicated integrated circuit such as an application-specific integrated circuit (ASIC), or in a dedicated field-programmable gate array (FPGA). In some examples, the backup may be implemented as instructions, e.g., stored on a machine-readable storage medium of the computing device 100, which, when executed by a processor 114, perform the functionality of the backup. For instance, backup may be implemented via partially or fully in an operating system of the computing device 100 that runs on the processor 114.

In certain examples, the BIOS firmware 116 may execute this copy task which may be relatively secure and robust in preserving data, and may avoid involvement of OS interaction. Of course, OS interaction may be implemented if desired. For a BIOS firmware 114 execution, when a panic power interruption or other catastrophic event occurs, the hardware may first flush the processor 114 volatile memory buffers or cache to the memory subsystem including the system memory controller 122 and volatile memory modules 102 (e.g., RAM), and set the memory subsystem into a self-refresh state. In DRAM technology, DIMMs may be refreshed with a voltage to maintain contents. The self-refresh state may be a state where the DIMMs will refresh their contents without a signal from the memory controller 122.

After this initial flush, the processor 114 may be warm reset to begin executing the BIOS firmware 116. In view of support for this architecture for persistence, the straight line execution of BIOS code may be a hindrance. Thus, a prioritized set of tasks may provide for better use of the energy in a UPS 110, at least with respect to the copy task for the backup operation. Accordingly, once a panic warning occurs, the copy task may be started immediately or soon thereafter. Such may be accomplished in various ways. In one example, the BIOS may begin executing with knowledge of the triggering event, and use that status to either execute or skip the straight line tasks. Examples in this scenario may include to: (1) skip the loading of the Platform Early Initialization Modules and the Driver Execution Environments (DXE) drivers not essential to the loading of the UEFI driver managing the backup medium, i.e., the nonvolatile memory 106; (2) set up baseboard management controller (BMC) for error logging; (3) skip the Peripheral Component Interconnect Express (PCIe) enumeration for non-essential devices, i.e., for devices not associated with copying of the contents from volatile memory 103 to nonvolatile memory 106. For instance, in a system where the nonvolatile memory drives (e.g., nonvolatile memory 106), the nonvolatile memory drive endpoints would be enumerated whereas the network interface controllers/cards (NICs) would generally not be enumerated; and (4) once enumeration of the endpoint device is finished or completed, the backup medium UEFI driver execution is prioritized as high and implemented. Another example may be that system hardware could reset, or stop providing power to, non-essential PCIe devices and thus reducing UPS 110 power consumed. Of course, other examples are applicable.

Other alternatives in prioritizing tasks may involve DMA and/or multi-threading. Indeed, using multiple threads may be implemented with more than one core of the system processor 114 and/or the controller of the target drives (nonvolatile memory 106). The IO multiple threads of controller capability of the target drive controller, i.e., the storage controller of the nonvolatile memory 106 as an end-point drive may accommodate multiple queues.

Figure 1A:
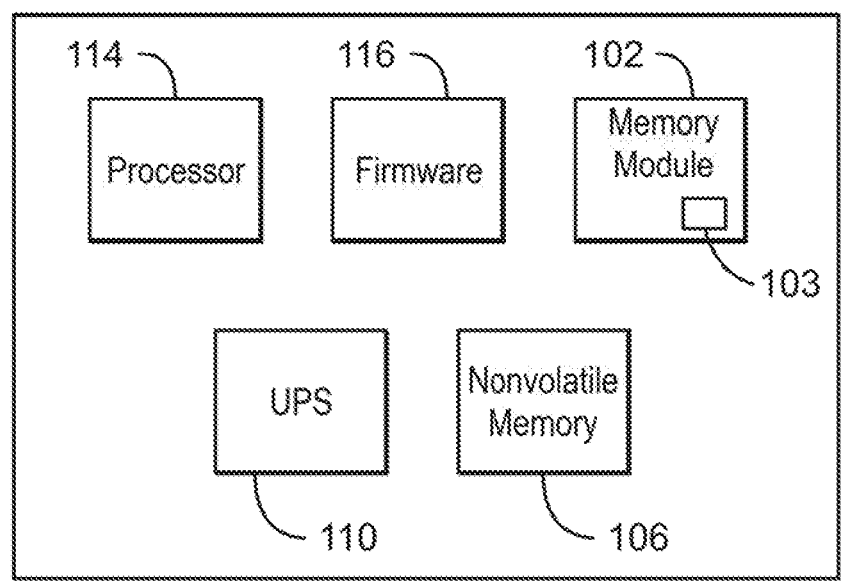
FIG. 1A is a block diagram of a computing device having an architecture for copying data from volatile memory of a memory module to nonvolatile memory external to the memory module during a catastrophic event such as loss of power in accordance with examples.

FIG. 1A is a block diagram of the computing device 100 having an architecture for copying data from volatile memory 103 of the memory module 102 to the nonvolatile memory 106 external to the memory module 102 during a catastrophic event such as loss of power in certain examples. The computing device 100 includes the UPS 110 to supply power to the computing device 100 during loss of primary power. The computing device includes the processor 114 and the firmware 116. The firmware 116 is executed by the processor 114 to copy contents of the volatile memory 103, during the loss of primary power, to the nonvolatile memory 106 external to the memory module 102, wherein the tasks of the firmware 116 are prioritized to elevate tasks associated with the copying of the contents of the volatile memory 103 to the nonvolatile memory 106.

Figure 2:
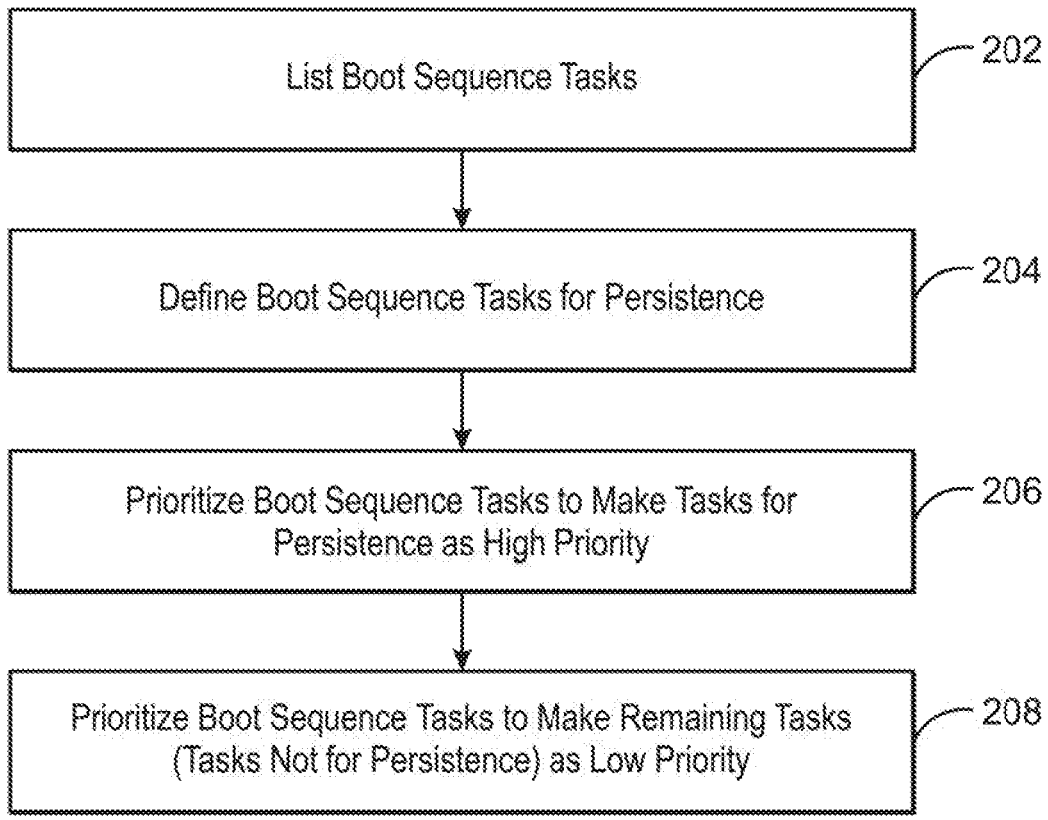
FIG. 2 is a block flow diagram of method of a defining and prioritizing boot sequence tasks for persistence during a catastrophic event, such as loss of power, in accordance with examples.

FIG. 2 is an exemplary method 200 of configuring a computing device (e.g., computing device 100 of FIG. 1) having a firmware or BIOS stored in nonvolatile memory such as ROM. At block 202, the boot sequence tasks of the BIOS are listed. At block 204, the boot sequence tasks associated with persistence are defined. In other words, boot sequence tasks are identified for components involved in the copying of data from volatile memory on a memory module to nonvolatile memory external to the memory module. At block 206, the method includes prioritizing the boot sequence such that these boot sequence tasks associated with persistence are elevated to a high priority so to execute first or early in the boot sequence. Consequently, at block 208, the prioritizing of the boot sequence gives the remaining boot sequence tasks, i.e., those boot sequence tasks not associated with persistence, as a lower priority. In other words, most or all of the boot sequence tasks not needed for components involved in the backup copying of the volatile data to nonvolatile memory are lower priority and will generally execute in the boot sequence after the boot sequence tasks for persistence.

Thus, a first boot sequence may be a standard sequence used during a normal or typical boot. A second boot sequence may be prioritized for persistence, as discussed. The second boot sequence may be employed in a loss of power scenario where the computing device is operating with limited power via a UPS. To initiate the second boot sequence, the system processor or CPU may be subjected to a warm reset, for example. This BIOS boot sequence prioritized for the persistence or copying task may be within the BIOS saved in the nonvolatile memory. In examples, a prioritized boot sequence(s) may be within the normal boot sequence, and the BIOS detects whether to execute normal or prioritized, based on a latch read by the BIOS, for instance. In a particular example, when a power-loss condition is detected by the CPLD, a GPI is latched to store this condition while the main power is still on. Very early in POST, this latch is read by BIOS and can determine which path (the normal sequence or the prioritized boot sequence) to take. BIOS would then clear this latch so that a subsequent reset will not take the prioritized boot sequence. Also, a loss of main power may clear the latch as well.

Figure 3:
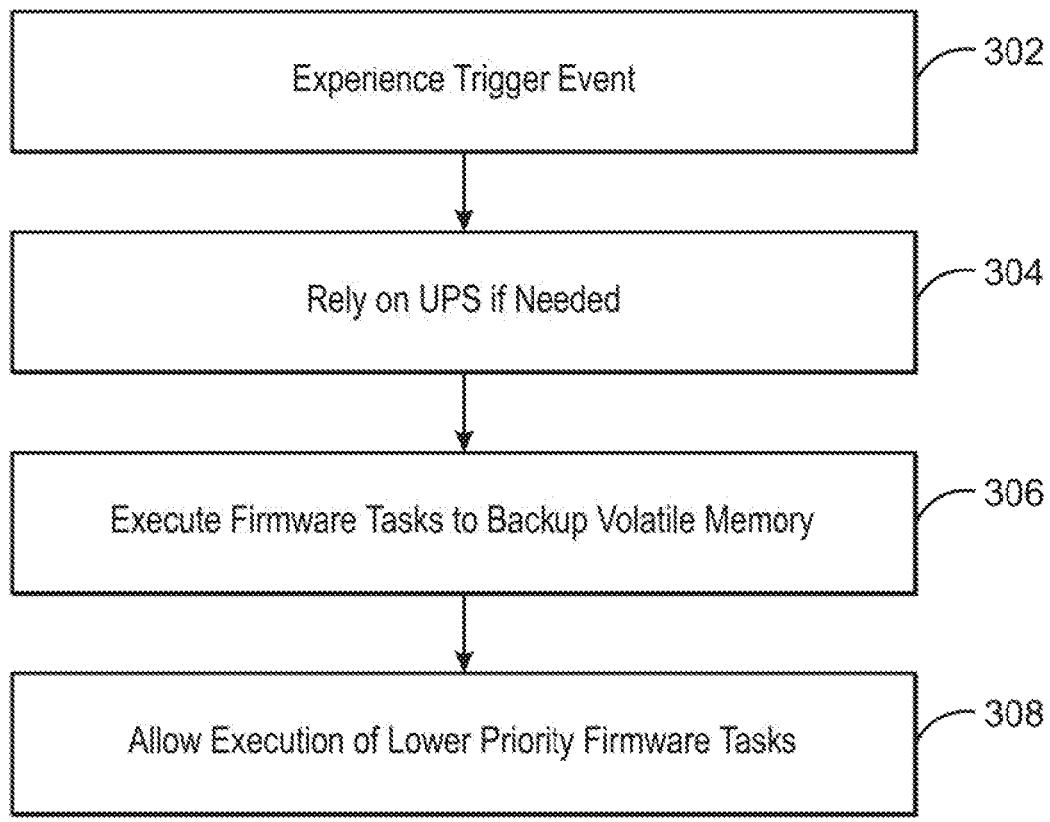
FIG. 3 is a block flow diagram of method of a computing device experiencing a catastrophic event such as loss of power or an error, and accommodating copying of volatile memory contents to nonvolatile memory in accordance with examples.

FIG. 3 is an exemplary method 300 of operating a computing device (e.g., computing device 100 of FIG. 1) having a memory module with volatile memory, a UPS in the computing device, nonvolatile memory (e.g., SS disk or SSD, hard drives, other NVDIMMS, etc.) external to the memory module, and firmware or BIOS stored in nonvolatile memory such as ROM. At block 302, the computing device (e.g., a server) experiences a trigger event that may be (or cause) an interruption of power to the computing device or to components of the computing device. The trigger event may be a catastrophic event such as a loss of main power, a catastrophic error, a CATERROR, and so on. At block 304, the computing device may operate with power supply from the UPS inside the computing device if needed. In certain examples, the UPS may be a small or micro UPS, and in particular examples, is embedded in the PSU of the computing device. In some examples, the UPS provides a relatively short time of power supply to the computing device. At block 306, the method includes executing firmware (e.g., BIOS) tasks to copy data from the volatile memory on the memory module to nonvolatile memory external to the memory module. These tasks relating to the copying of the data may be for persistence and a high priority. An intent may be to complete the copying of data prior to expiration of the power supply from the UPS. At block 308, after completion of, and/or contemporaneous with, the copying of the data, the remaining boot sequence tasks (i.e., those generally not involved with the copying or persistence), are allowed to execute. These remaining tasks may generally be a lower priority so not to rob UPS power from the action of copying the data for persistence. Some or all of these remaining tasks may execute prior to expenditure or consumption of all of the UPS power, depending on the initial amount of power in the UPS, the load of the computing device, and other factors.

Figure 3A:
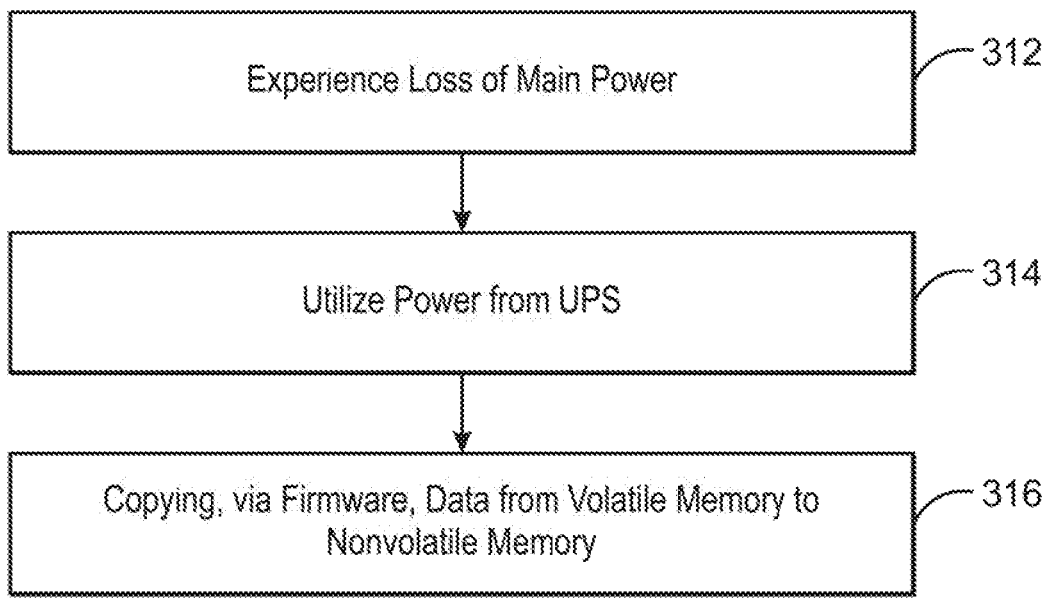
FIG. 3A is a block flow diagram of method of a computing device experiencing a loss of main power, and accommodating copying of volatile memory contents to nonvolatile memory in accordance with examples.

FIG. 3A is a method 310 of a computing device experiencing a loss of main power, and accommodating copying of volatile memory contents to nonvolatile memory. At block 312, the computing device experiences a loss of main power. The computing device includes a processor, firmware, an uninterruptible power supply (UPS), and a memory module having volatile memory. At block 314, the method includes the computing device utilizing power from the UPS during the loss of main power. At block 316, the method includes copying, via the firmware, data from the volatile memory to nonvolatile memory external to the memory module during the loss of main power. The tasks of the firmware are prioritized to elevate tasks associated with the copying of the data from the volatile memory to the nonvolatile memory. The tasks of the firmware as prioritized may include to skip tasks not associated with or needed for the copying of the contents of the volatile memory to the nonvolatile memory. For instance, as discussed, tasks to skip may include to skip loading Platform Early Initialization Modules and DXE drivers not essential to loading of a UEFI driver managing the nonvolatile memory, and to skip PCIe enumeration for devices not associated with the copying of the contents from volatile memory to nonvolatile memory.

Figure 4:
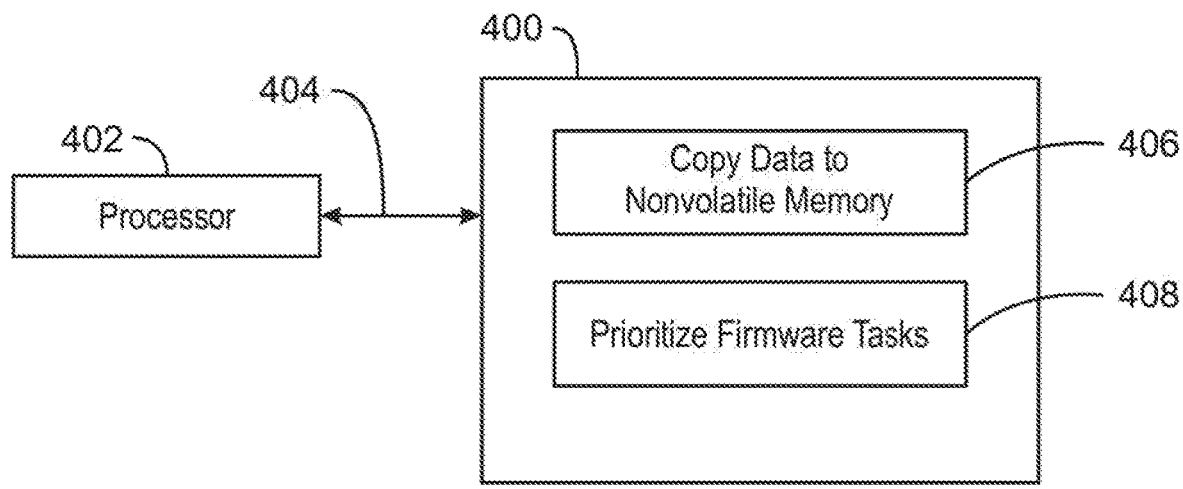
FIG. 4 is a block diagram showing a tangible, non-transitory, computer-readable medium that stores code configured to direct a computing device to prioritize firmware tasks in the copying of volatile memory contents to nonvolatile memory in accordance with examples.

FIG. 4 is a block diagram showing a tangible, non-transitory, computer-readable medium that stores code configured to operate a data storage system. The computer-readable medium is referred to by the reference number 400. The computer-readable medium 400 can include RAM, a hard disk drive, an array of hard disk drives, an optical drive, an array of optical drives, a non-volatile memory, a flash drive, a digital versatile disk (DVD), or a compact disk (CD), among others. The computer-readable medium 400 may be accessed by a processor 402 over a computer bus 404. Furthermore, the computer-readable medium 400 may include code configured to perform the methods and techniques described herein. The computer readable medium 400 may be memory of the computing device 100 of FIGS. 1 and 2 in certain examples. The computer readable medium 400 may include firmware code (e.g., firmware 116 code) that is executed by a processor (e.g., the processor 114) of the computing device 100 of FIG. 1.

The various software components discussed herein may be stored on the computer-readable medium 400. For example, a portion 406 may include instructions that direct a processor to copy, via firmware of a computing device, data from volatile memory of a memory module of the computing device to nonvolatile memory external to the memory module during a loss of primary power to the computing device. A portion 408 may include instructions that prioritize firmware tasks associated with the copying of the volatile memory to the nonvolatile memory over other firmware tasks. The firmware tasks may include BIOS boot sequence tasks. Again, such tasks may facilitate components of the computing device to copy contents from volatile memory of a memory module to nonvolatile memory external to the memory module. Although shown as contiguous blocks, the software components can be stored in any order or configuration. For example, if the tangible, non-transitory, computer-readable medium is a hard drive, the software components can be stored in non-contiguous, or even overlapping, sectors.

In summary, an example of computing device may include a processor (e.g., CPU), a memory module (e.g., a DIMM) having volatile memory for RAM, and an UPS to supply power to the computing device during loss of primary power. The computing device includes firmware executed by the processor to copy contents of the volatile memory, during the loss of primary power, to a nonvolatile memory (e.g., SSD, hard disk drive, flash media, etc.) external to the memory module, wherein the tasks of the firmware are prioritized to elevate tasks associated with the copying of the contents of the volatile memory to the nonvolatile memory. The firmware may include a BIOS stored in ROM or other memory. Further, the tasks of the firmware prioritized may be BIOS boot sequence tasks, and the elevated tasks are boot sequence tasks associated with the copying of the contents of the volatile memory to the nonvolatile memory. The tasks of the firmware as prioritized may include to skip tasks not associated with or needed for the copying of the contents of the volatile memory to the nonvolatile memory. Tasks to skip may include to skip loading of Platform Early Initialization Modules and DXE drivers not essential to loading of a UEFI driver managing the nonvolatile memory. Other tasks to skip may include to skip comprise to skip PCIe enumeration for devices not associated with the copying of the contents from volatile memory to nonvolatile memory. For example, the devices not associated with the copying of the contents may include a network interface controller. Moreover, the tasks of the firmware as prioritized may rely on multi-threading some tasks associated with the copying of the contents of the volatile memory to the nonvolatile memory.

The computing device may include a PSU to convert AC to DC. If so, the UPS may embedded in the PSU in certain examples. Moreover, the computing device may have a system memory controller to facilitate the copying of the contents from the volatile memory to the nonvolatile memory, wherein the system memory controller is external to the memory module. In some examples, the computing device may include an integrated circuit to intercept an error signal from the processor, the intercept delaying a system shutdown of the computing device. Furthermore, the computing device may have a hub architecture, wherein the error signal is intended for the hub architecture to instruct a system shutdown of the computing device, and wherein the hub architecture is, for example, a south bridge or a PCH.

Another example is a method for a computing device having a processor, firmware, UPS, and a memory module (e.g., DIMM) having volatile memory. The firmware may include BIOS stored in ROM. In particular examples, the UPS is embedded in a PSU inside the computing device. The method includes experiencing a loss of main power at the computing device and utilizing power from the UPS during the loss of main power. The method includes copying, via the firmware, data from the volatile memory on the memory module to nonvolatile memory external to the memory module during the loss of main power, while the computing device is supplied with power from the UPS. The tasks of the firmware are prioritized to elevate tasks associated with the copying of the data from the volatile memory to the nonvolatile memory. The tasks of the firmware as prioritized may include to skip tasks not associated with or needed for the copying of the contents of the volatile memory to the nonvolatile memory. For instance, as discussed, tasks to skip may include to skip loading Platform Early Initialization Modules and DXE drivers not essential to loading of a UEFI driver managing the nonvolatile memory, and to skip PCIe enumeration for devices not associated with the copying of the contents from volatile memory to nonvolatile memory.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing device comprising:
   a processor;
   a memory module comprising volatile memory for random access memory (RAM);
   an uninterruptible power supply (UPS) to supply power to the computing device during loss of primary power; and
   firmware executed by the processor to copy contents of the volatile memory, during the loss of primary power, to a nonvolatile memory external to the memory module, wherein the tasks of the firmware are prioritized to elevate tasks associated with the copying of the contents of the volatile memory to the nonvolatile memory;
   wherein the tasks of the firmware that are prioritized are basic input/output system (BIOS) boot sequence tasks, and the elevated tasks are boot sequence tasks associated with the copying of the contents of the volatile memory to the nonvolatile memory.

2. The computing device of claim 1, wherein the firmware comprises a basic input/output system (BIOS) stored in read-only memory (ROM).

3. The computing device of claim 1, wherein the tasks of the firmware are prioritized to elevate tasks associated with the copying of the contents of the volatile memory to the nonvolatile memory, comprises to skip tasks not associated with or needed for the copying of the contents of the volatile memory to the nonvolatile memory.

4. The computing device of claim 3, wherein the tasks to skip comprise to skip loading of Platform Early Initialization Modules and Driver Execution Environments (DXE) drivers not essential to loading of a Unified Extensible Firmware Interface (UEFI) driver managing the nonvolatile memory.

5. The computing device of claim 3, wherein the tasks to skip comprise to skip Peripheral Component Interconnect Express (PCIe) enumeration for devices not associated with the copying of the contents from volatile memory to nonvolatile memory, and wherein the devices not associated with the copying of the contents comprise a network interface controller.

6. The computing device of claim 1, wherein the tasks of the firmware are prioritized comprises to rely on multi-threading some tasks associated with the copying of the contents of the volatile memory to the nonvolatile memory.

7. The computing device of claim 1, comprising
   a system memory controller to facilitate the copying of the contents from the volatile memory to the nonvolatile memory, wherein the system memory controller is external to the memory module; and
   a power supply unit (PSU), wherein the UPS is embedded in the PSU.

8. A method for a computing device, comprising:
   experiencing a loss of main power at the computing device, the computing device comprising a processor, firmware, an uninterruptible power supply (UPS), and a memory module having volatile memory;
   utilizing power from the UPS during the loss of main power; and
   copying, via the firmware, data from the volatile memory to nonvolatile memory external to the memory module during the loss of main power, wherein the tasks of the firmware are prioritized to elevate tasks associated with the copying of the data from the volatile memory to the nonvolatile memory;
   wherein the tasks of the firmware comprise basic input/output system (BIOS) boot sequence tasks.

9. The method of claim 8, wherein the firmware comprises a basic input/output system (BIOS) stored in read-only memory (ROM).

10. The method of claim 8, wherein the tasks of the firmware are prioritized to elevate tasks associated with the copying of the contents of the volatile memory to the nonvolatile memory, comprises to skip tasks not associated with or needed for the copying of the contents of the volatile memory to the nonvolatile memory.

11. The method of claim 10, wherein the tasks to skip comprise to skip loading of Platform Early Initialization Modules and Driver Execution Environments (DXE) drivers not essential to loading of a Unified Extensible Firmware Interface (UEFI) driver managing the nonvolatile memory.

12. The method of claim 10, wherein the tasks to skip comprise to skip Peripheral Component Interconnect Express (PCIe) enumeration for devices not associated with the copying of the contents from volatile memory to nonvolatile memory.

13. A tangible, non-transitory, computer-readable medium comprising instructions that direct a processor to:
   copy, via firmware of a computing device, data from volatile memory of a memory module of the computing device to nonvolatile memory external to the memory module during a loss of primary power to the computing device; and
   prioritize firmware tasks associated with the copying of the volatile memory to the nonvolatile memory over other firmware tasks;
   wherein the firmware tasks comprise basic input/output system (BIOS) boot sequence tasks.

* * * * *